United States Patent [19]

Bayne et al.

[11] 4,391,387
[45] * Jul. 5, 1983

[54] MAGNETIC TICKET DISPENSER

[75] Inventors: Robert T. Bayne, Carmel; Phillip E. Shireman, Martinsville, both of Ind.

[73] Assignee: Standard Change-Makers, Inc., Indianapolis, Ind.

[*] Notice: The portion of the term of this patent subsequent to Apr. 27, 1999, has been disclaimed.

[21] Appl. No.: 278,741

[22] Filed: Jun. 29, 1981

Related U.S. Application Data

[63] Continuation of Ser. No. 71,921, Sep. 4, 1979, Pat. No. 4,326,643.

[51] Int. Cl.³ .............................................. B65H 3/14
[52] U.S. Cl. ....................................... 221/13; 221/278
[58] Field of Search ............... 271/97, 98, 5; 221/278, 221/212, 10, 13, 268

[56] References Cited

U.S. PATENT DOCUMENTS

| | | | | |
|---|---|---|---|---|
| 3,136,539 | 6/1964 | Lyman | | 271/97 |
| 3,198,515 | 8/1965 | Pitney | | 271/97 |
| 3,411,829 | 11/1968 | Albright | . | |
| 3,504,910 | 6/1968 | Spyropoulos | . | |
| 3,511,495 | 5/1970 | Schonfeld | | 271/97 |

FOREIGN PATENT DOCUMENTS

| | | | |
|---|---|---|---|
| 1901846 | 9/1969 | Fed. Rep. of Germany | . |
| 2274529 | 1/1976 | France | . |
| 55-61544 | 5/1980 | Japan | 271/97 |

Primary Examiner—Stanley H. Tollberg
Attorney, Agent, or Firm—Woodard, Weikart, Emhardt & Naughton

[57] ABSTRACT

An apparatus for dispensing tickets including a container having a vertically extending opening loosely receiving a stack of tickets. The container has adjacent its top a ticket passage slot which leads from the opening in the container to the outside of the container. An elevator is mounted for vertical movement in the container and is adapted to support the stack of tickets. A control device operates the elevator to position the uppermost ticket slightly below the top. The container has air jet orifices therein, a first set of which is located in the container sidewall on the opposite side of the container from the slot, a second located in the container top on the opposite side of the container from the slot and a third located in the container top above the slot. A pneumatic device provides a blast of air under pressure through each of the orifices to move a ticket from the top of the stack of tickets out of the container through the slot. The apparatus also includes a ticket guide plate between two sets of rollers. When the tickets exit the slot, they move through the rollers where they are sensed photoelectrically. If the tickets are stuck together as they move through the rollers, they are dumped into a double ticket stacking container. If only a single ticket moves through the rollers, it is dumped into a ticket delivery chute.

2 Claims, 14 Drawing Figures

MAGNETIC TICKET DISPENSER

This application is a continuation of application Ser. No. 71,921, filed Sept. 4, 1979, now U.S. Pat. No. 4,326,643.

BACKGROUND OF THE INVENTION

This invention relates in general to an apparatus for dispensing flat objects, said apparatus being particularly adapted for dispensing magnetic tickets.

Present machines to automatically dispense magnetic tickets are difficult to develop, usually because of certain characteristics of the ticket. In order for the surface of the ticket to function efficiently as a magnetic recording medium, it must possess an extrememly smooth surface, be somewhat flexible (which dictates a thin ticket) and be sufficiently durable in the hands of the public user. The above facts are predominant in the design of the tickets currently in use by rapid transport systems. At least some of the tickets currently in use measure 3.375 inches by 2.125 inches in their rectangular dimensions and are approximately 0.011 inches thick. They are made from plastic, and are coated upon one surface with magnetic recording medium, while on the other side, the ticket's destination and origin location is usually printed.

The ticket is a truly laminated construction with paint or ink on the top surface, magnetic ferrous-oxide on the bottom surface and plastic in between. This laminated construction has characteristics not unlike a bi-metallic strip with unequal thermal expansion layers. The usual result is that even new tickets are not exactly flat and may have a slight convex or concave shape depending on the plastic used, the paint or ink employed and the thickness of the magnetic coating. In order to be machine vended, the tickets are usually stacked, on top of one another, in quantities of a few hundred to several thousand.

Figure 1:
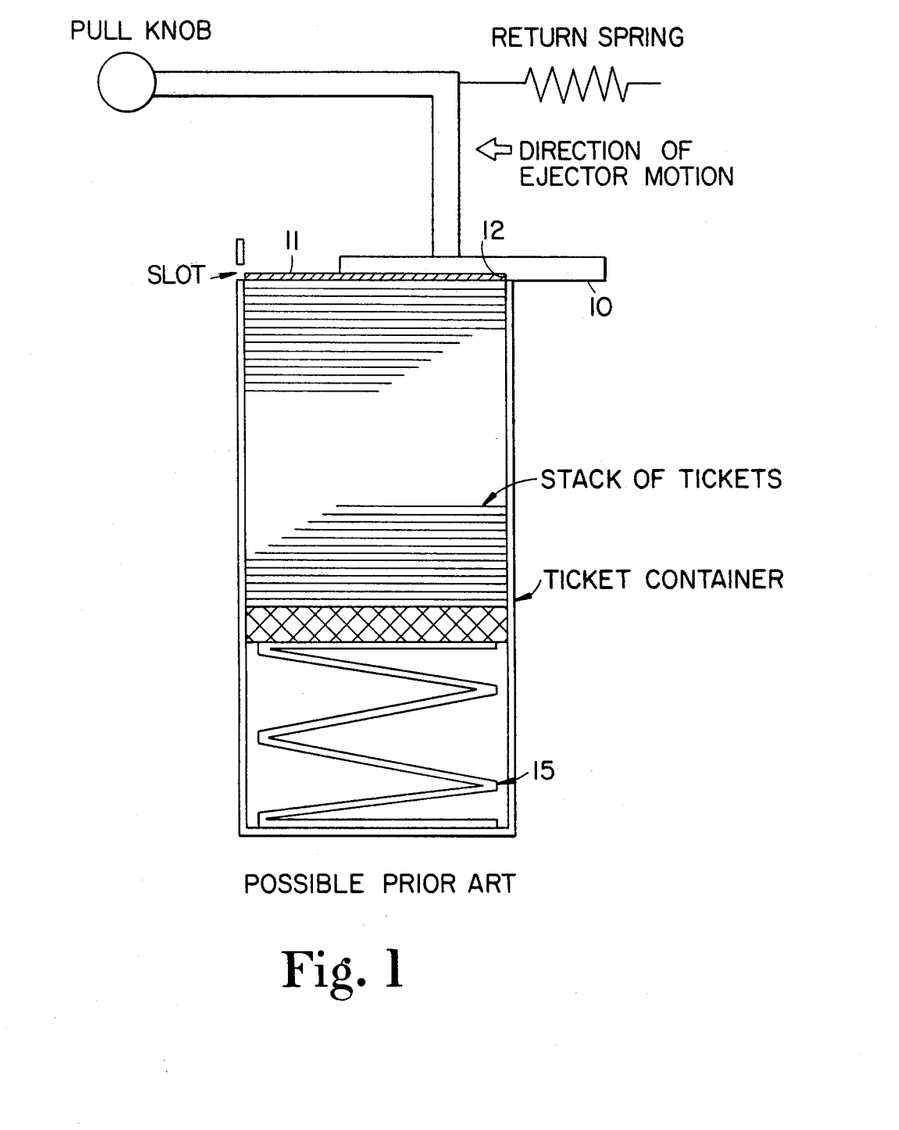
FIG. 1 is a somewhat schematic vertical section of a device believed to be prior art.

FIG. 1 represents one method of mechanically vending the magnetic ticket. This method or minor variations of the same principle are used in present ticket vendors. A moveable ejector 10 is used to engage the back side of the ticket 11 by means of the ridge 12. The ejector engages one thickness of ticket and pushes or slides a single ticket out of the stack. Since the tickets are only 0.011 inches thick, the precision of the ejector plate, slide bearings and other parts of a machine of this type must be very high. The spring 15 pressing the tickets together must be sufficiently strong to flatten the tickets against the ejector plate 10. Any wear in a machine of this type will usually result in the vending of two tickets at once or possibly no ticket at all.

Other examples of possible prior art devices are shown in the following patents:

| Patent No. | Inventor |
| --- | --- |
| 3,134,588 | Zeutschel |
| 3,546,431 | Wagner |
| 3,174,645 | Barcia et al. |
| 3,767,080 | Erickson |
| 3,774,904 | Foret et al. |
| 3,868,044 | Abe et al. |
| 4,020,972 | Lundblad |
| 4,042,147 | Lee |

These patents show a representative sampling of devices for dispensing by the use of compressed air and devices for preventing the dispensing of two tickets or other objects when only one should be dispensed.

SUMMARY OF THE INVENTION

One embodiment of the present invention might involve an apparatus for dispensing rectangular tickets or the like including a container having a vertically extending opening therein with a rectangular horizontal cross section adapted to loosely receive a stack of tickets. The container has a top and a ticket passage slot adjacent the top. The slot leads from the opening in the container to the outside of the container. An elevator is mounted for vertical movement in the container and is adapted to support the stack of tickets. There is also provided means for operating the elevator to position the uppermost ticket thereon slightly below the top. The container has air jet orifices therein, a first of which is located in the container sidewall on the opposite side of the container from the slot. A second of the orifices is located in the container top on the opposite side of the container from the slot and a third of the orifices is located in the container top above the slot. There is also provided means for providing a blast of air under pressure through each of the orifices to move a ticket from the top of the stack of tickets out of the container through the slot.

One object of the present invention is to provide an improved dispenser apparatus.

Another object of the present invention is to provide a ticket dispensing apparatus constructed and arranged to efficiently dispense tickets incorporating a laminated magnetic recording medium.

Related objects and advantages will become apparent as the description proceeds.

DESCRIPTION OF THE PREFERRED EMBODIMENT

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIGS. 2-7, there is illustrated a ticket container 20 which has a vertically extending opening 21 therein. An elevator 22 which includes a platen 25 moves vertically in the opening 21 in order to support and locate a stack of tickets 26 so that the uppermost one of the tickets is in a position for dispensing. The container 20 has a generally rectangular cross section which is adapted to loosely receive the tickets so as to permit them to be easily moved upwardly in the container but retained in the stack. The elevator is powered by a reversible electric motor 27 which is mounted on the container 20. The motor has an output screw 30 which is threaded through floating nut 31 loosely mounted in the elevator platen 25. The motor 27 is reversible so that the motor may turn the screw 30 either clockwise or coutnerclockwise to raise or lower the tickets. There is also provided a guide shaft 32 fixed to the container 20 with the platen slidable on the guide shaft. The action of the guide shaft 32 interacting with the screw 30 serves to keep the platen 25 mechanically aligned in the X, Y and Z coordinates. The elevator controls the height of the tickets, and in particular, the height of the top several tickets.

Figure 2:
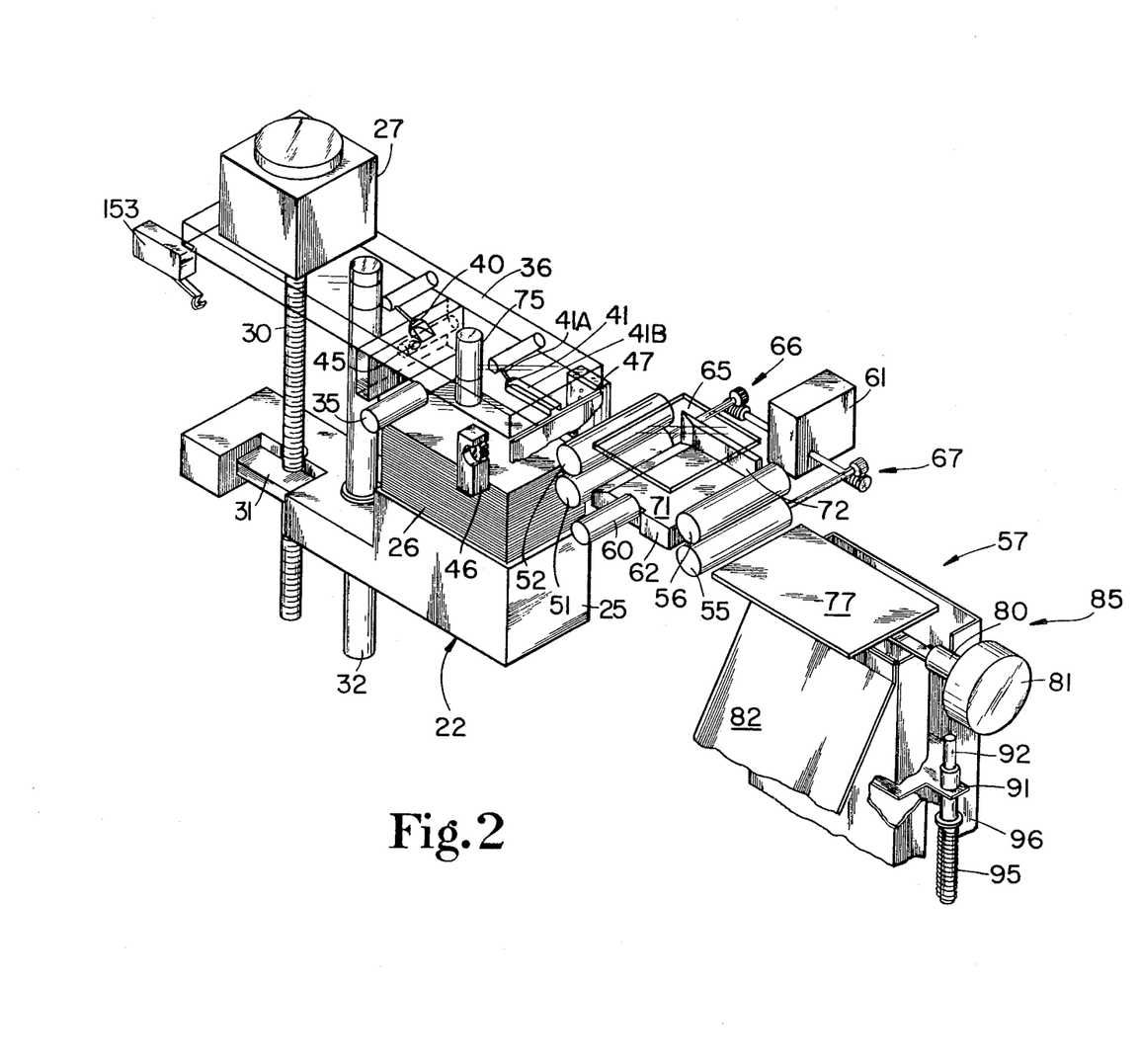
FIG. 2 is a perspective schematic view with portions broken away of the dispenser mechanism of the present invention.
Figure 3:
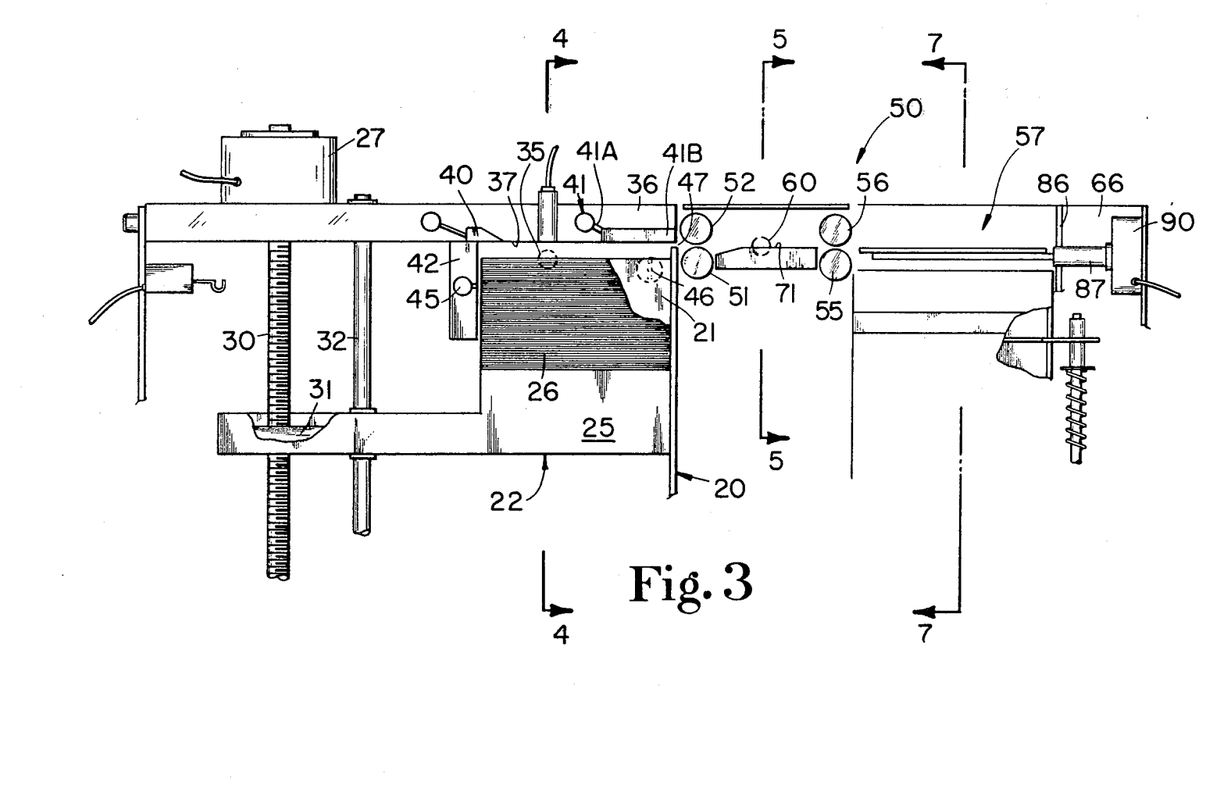
FIG. 3 is a vertical section through the structure illustrated in FIG. 2.
Figure 4:
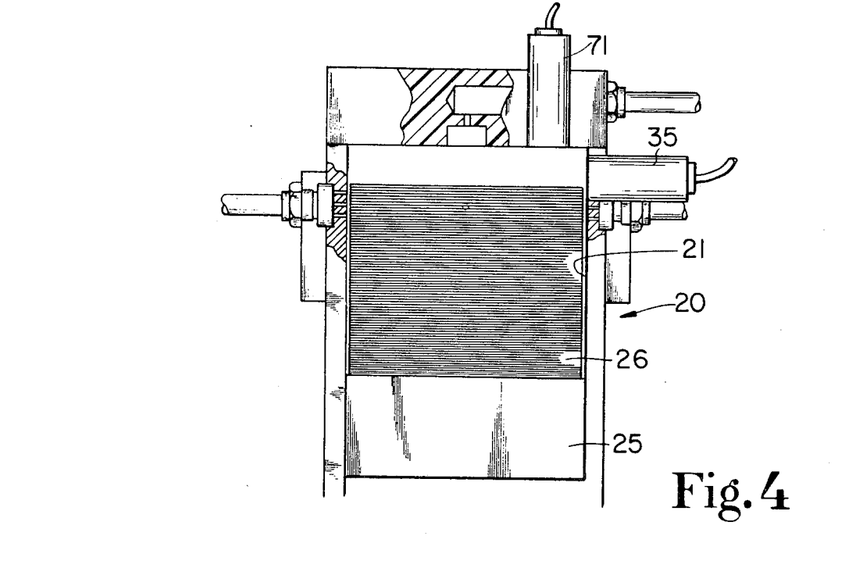
FIG. 4 is a vertical section taken along the lines 4—4 of FIG. 3 in the direction of the arrows.
Figure 5:
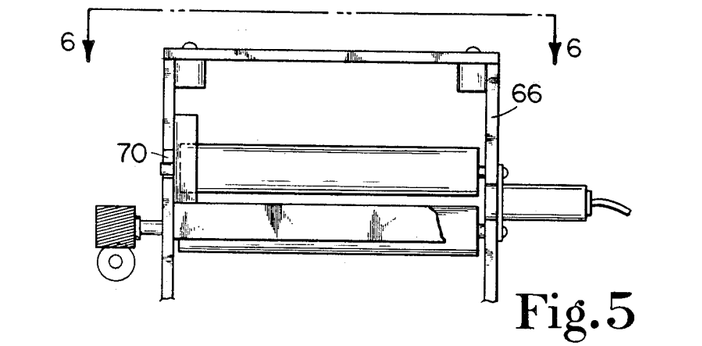
FIG. 5 is a vertical section taken along the lines 5—5 of FIG. 3 in the direction of the arrows.
Figure 6:
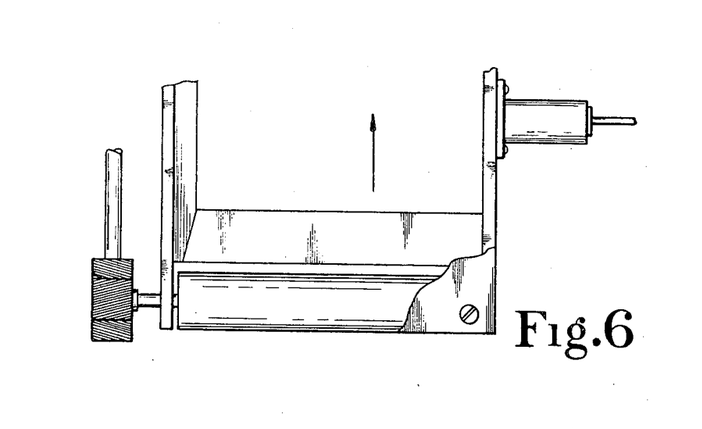
FIG. 6 is a horizontal section taken along the line 6—6 of FIG. 5 in the direction of the arrows.
Figure 7:
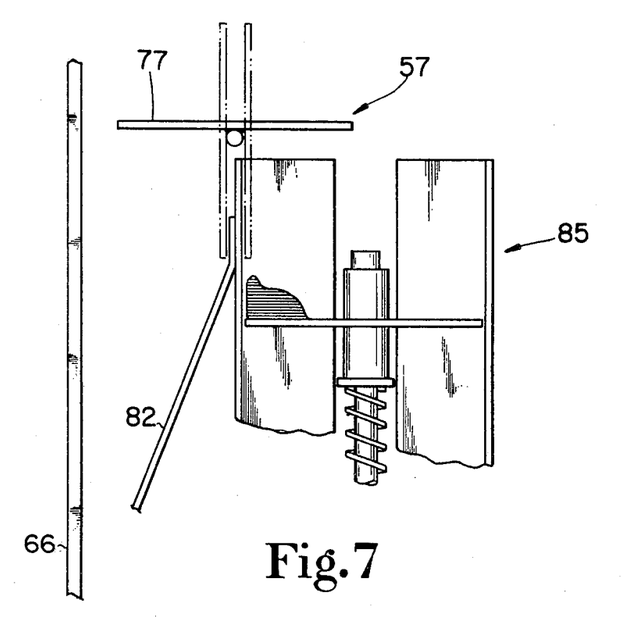
FIG. 7 is a vertical section taken along the line 7—7 of FIG. 3.

The ticket height sensor 35 "sees" the edges of the several top tickets and controls motor 27 in a manner to maintain the top of the tickets stack at a reasonably constant height. As top tickets are removed from the stack the motor turns to raise the stack. Thus the top ticket is kept approximately a constant distance below the container top 36 even while the mechanism is vending tickets from the stack. The electrical-optical action of the ticket height sensor 35 will be explained in more detail below. As shown in the drawing the tickets are not fully raised by the elevator. In the operable position the top ticket would be approximately ⅜ inch below the lower surface 37 of the container top 36. When the top several tickets are raised to this position, they may be acted upon by the air-jets.

Five different air jet orifices are provided in the container. Two are located within container top i.e. the ejector orifice 40 and the venturi orifice 41. One is contained within the sidewall 42 of the container and is called the agitator orifice 45. Orifice 40 and orifice 45 are controlled by a first valve 105 (See FIG. 10). Orifice 41 is controlled by a second valve 102 (See FIG. 10). These two valves are electromagnetically turned "on" or open. In the unactuated state (no current) they are "off" or closed. The remaining two air jets 46 associated with the container are called ripple jets and are located on both sides of the container near the top thereof.

The air jet orifice 41 includes two cavities, an air inlet 41A and a slot or chamber 41B. The chamber 41B is elongated and generally rectangular, is milled into the top 36 and forms an expansion chamber for the small diameter orifice. With air under pressure applied to the air inlet 41A, a venturi is created to produce a low air pressure in the vicinity of the milled slot. The resulting partial vacuum in the top of the container causes the top ticket to be lifted from the top of the ticket stack to a position adjacent a ticket slot 47 in the sidewall of the container and contiguous the top thereof.

The group of orifices above described are sequentially subjected to pulses of air pressure by action of the electrically operated valve associated with each orifice. An electronic time sequence controller supplies current pulses to the valves with the correct time and sequence for each pulse. The net result is to produce within the ticket container a series of air bursts which are timed and overlapped correctly to make the top ticket of the stack "fly" itself out of the box through the slot 47. The slot is partially defined by a continuation of the lower surface of the container top and is approximately 0.022 wide or about twice the thickness of a ticket. The slot is immediately adjacent a feed roller and detector system 50 which includes a drive roller 51 and an idler roller 52.

As mentioned, the venturi orifice lifts the top ticket off the ticket stack and places it in a suspended position against the container top 36. The ticket is now ready to move out of the slot into the rollers 51 and 52. The ejector orifice 40 is now supplied with a time pulse of air pressure causing a flow of air over the top and bottom of the suspended ticket. In addition, the blast of air strikes the back edge of the ticket pushing it toward the slot 47. The air friction of the air moving over the top and bottom of the ticket moves it forwardly through the slot.

Orifice 45, located just under orifice 40, has a common air supply with 40. Therefore, when air is furnished to orifice 40, an air blast also issues from orifice 45. Orifice 45 is adjacent the ticket stack but downwardly about ½ inch from the top of the ticket stack when the stack is in vending position as illustrated in FIG. 3. The air blast furnished by orifice 45 is used to agitate or break apart the closely packed tickets. This particular jet prepares the tickets for vending prior to the tickets attaining the vend position.

In addition to a jet 45 to break apart tickets, the ripple jets 46 on each side of the container function to keep a ripple of air or a layer of air molecules between the top several tickets or at least below the single top ticket. Air is continuously furnished to the ripple jets. A manual valve (not shown) is provided for adjusting the ripple jets from off to full on.

When the individual tickets leave the dispense box they come under the control of the feed roller and detector system 50. The rollers 51 and 52 as well as rollers 55 and 56 carry the ticket from the container 20 to the two-way dump gate 57, on which the ticket is deposited. Located between the two sets of rollers is the double ticket detector 60. The feed roller and detector system 50 comprises the two sets of paired rollers, a roller drive motor 61, the light reflective sensor 60, a ticket guide plate 62, and an ambient light filter 65. The dispenser housing 66 serves as a track to control the lateral movement of the ticket.

The dispenser housing 66 is fixed relative to the container 20 and provides a mounting for the rollers 51, 52, 55 and 56 as well as the roller drive motor 61, light reflective sensor 60, ticket guide plate 62 and ambient light filter 65. The roller drive motor 61 is coupled to the drive rollers 51 and 55 through worm reduction gear systems 66 and 67. The rollers 51 and 55 are rotatably mounted on the dispenser housing whereas the idler rollers 52 and 56 are both rotatably and vertically moveable in vertically extending slots 70 in the dispenser housing.

The ticket slot 47 in the container is in alignment with the gap between the first set of rollers. Each set of rollers consists of a rubber drive roller below and a brass idler roller on top. The idler roller is free to move vertically to allow the ticket to pass through, but its weight holds the ticket against the drive roller so that the drive roller can pull the ticket through.

The ticket guide plate 62 is mounted between the two roller sets and has a top horizontal surface 71 which maintains the ticket in a horizontal attitude as it passes from one roller set to the other. An edge guide or fence 72 is mounted on the dispenser housing on one side of the guide plate and controls the lateral position of the ticket by forcing the ticket sideways to within 0.020" of the opposite side of the ticket track (dispenser housing). Thus the guide 72 accurately positions the ticket in front of the double ticket detector 60 as well as guiding the ticket through the second set of rollers. The leading edge of both the guide plate 62 and the fence is chamfered to allow the ticket to cam over or upward into the desired path.

The double ticket detector 60 is located opposite the edge guide or fence on the ticket guide plate and midway between the two sets of rollers. The detector is a light reflective sensor identical to the ticket height sensor 35 and out-of-tickets sensor 75. The sensors 60, 35 and 75 may be, for example, Model No. 23200028 manufactured by Welch-Allyn of Skaneateles Falls, New York 13153. The sensor 60 detects the presence of a ticket or tickets passing through the rollers and provides a signal back to the electronic control. From this signal the logic circuit will know if a ticket or tickets went through or not. If nothing is detected the logic circuit causes the circuit to try again. This cycle continues until a ticket is detected by the sensor. After the ticket clears the sensor there is a time delay which allows the ticket to clear the second set of rollers and drop on to the two-way dump gate 57. At the end of the time delay the dump gate becomes operative. If two tickets are detected the dump gate operation is modified. The ambient light filter 65 is tinted transparent plexiglas and is mounted above the guide plate and sensor and reduces the amount of interference caused by whatever ambient light the sensor might be exposed to. The ticket (or tickets) travel on past the sensor and through the second roller set. When the ticket clears the second roller set it drops on the two-way dump gate or plate 57.

A time delay is provided after the ticket clears the double ticket detector in order to allow the ticket time to clear the second roller set before any further action is taken. The dump gate 57 can then be rotated clockwise or counterclockwise in order to deliver the ticket or tickets to the delivery chute 82 or the double ticket stacker 85. The dump gate comprises a ticket-sized platform 77 mounted on a shaft 80. The shaft is coupled to a bidirectional stepper motor 81 that is mounted on the dispenser housing 66.

When a single ticket drops down from the rollers onto the dump gate 57, the stepper motor is rotated counterclockwise 90 degrees (as viewed in FIG. 7) in rapid, 7½ degrees steps. As the gate rotates the ticket feeds off the gate and drops down the ticket delivery chute 82. The interrupted motion of the stepper motor tends to bounce the ticket free of the platform so that there is no tendency for the ticket to stay on the platform. When the platform reaches 90 degrees (vertical) it hesitates, then rotates counterclockwise 90 degrees back to horizontal. If the double ticket detector senses that two tickets are coming out together, it tells the stepper motor to rotate counterclockwise 90 degrees. This drops the two tickets into the double ticket stacker 85 instead of dispensing two tickets to the customer. The dump gate rotates clockwise back to the horizontal position and the dispense cycle is repeated automatically until a single ticket is successfully delivered to the customer.

The dispenser housing 66 contains or guides the ticket while it is resting on the dump gate. A backing plate 86 stops the forward motion of the ticket when it is expelled from the rollers and acts as a guide for one edge of the ticket as it slides off the dump gate toward the chute or the stacker. Plate 86 also provides a mounting for a support bearing 87 for the dump gate shaft. The stepper motor 81 is mounted behind the backing plate. The second roller set 55 and 56 helps to contain the trailing edge of the ticket as the dump gate rotates.

The two-way dump gate provides a means of separating the single tickets that are to be vended and the double tickets that are to be stored. The single tickets are dropped into the deliver chute 82 which leads to the ticket tray where the customer can retrieve his ticket. The double tickets drop into the ticket stacker 85 which stores them in an orderly manner until the serviceman can remove them for reuse. The stacker 85 consists of a ticket support plate 91, guide rods 92, variable rate springs 95 and housing 96. The delivery chute 82 is a straight sheet metal channel that guides the ticket as it drops by gravity down to the ticket tray. A clear plexiglas cover (not shown) is attached to the chute which keeps the ticket in the chute and allows visual inspection.

Double tickets entering the stacker drop onto the ticket support plate 91. This plate is free to move up and down on the guide rods 92. The variable rate springs 95 on the guide rods support the plate in the desired position for receiving tickets. As tickets drop onto the plate their weight on the springs moves the plate downward, compensating for the ticket stack height. This creates an orderly situation so that the serviceman may easily remove them from the dispenser. A knob (not shown) beneath the support plate allows the serviceman to pull the plate down to a position where he can remove the double tickets. The sheet metal housing 96 contains the tickets and prevents them from falling off the support plate.

The above description has followed a ticket from the stack in the container 20, through the rollers, on to the dump gate and through the act of dispensing. While the mechanical structure and sequence of operations has been discussed, the details of the electrical controlling circuit and the system advantages gained have not yet been described. The major and overriding objective of the system is to reliably dispense a ticket after money is deposited. A second objective is to prevent the issuance of multiple tickets for a single fare. A third objective is to handle a great number of tickets with a single loading i.e. approximately 1,500.

Figure 8:
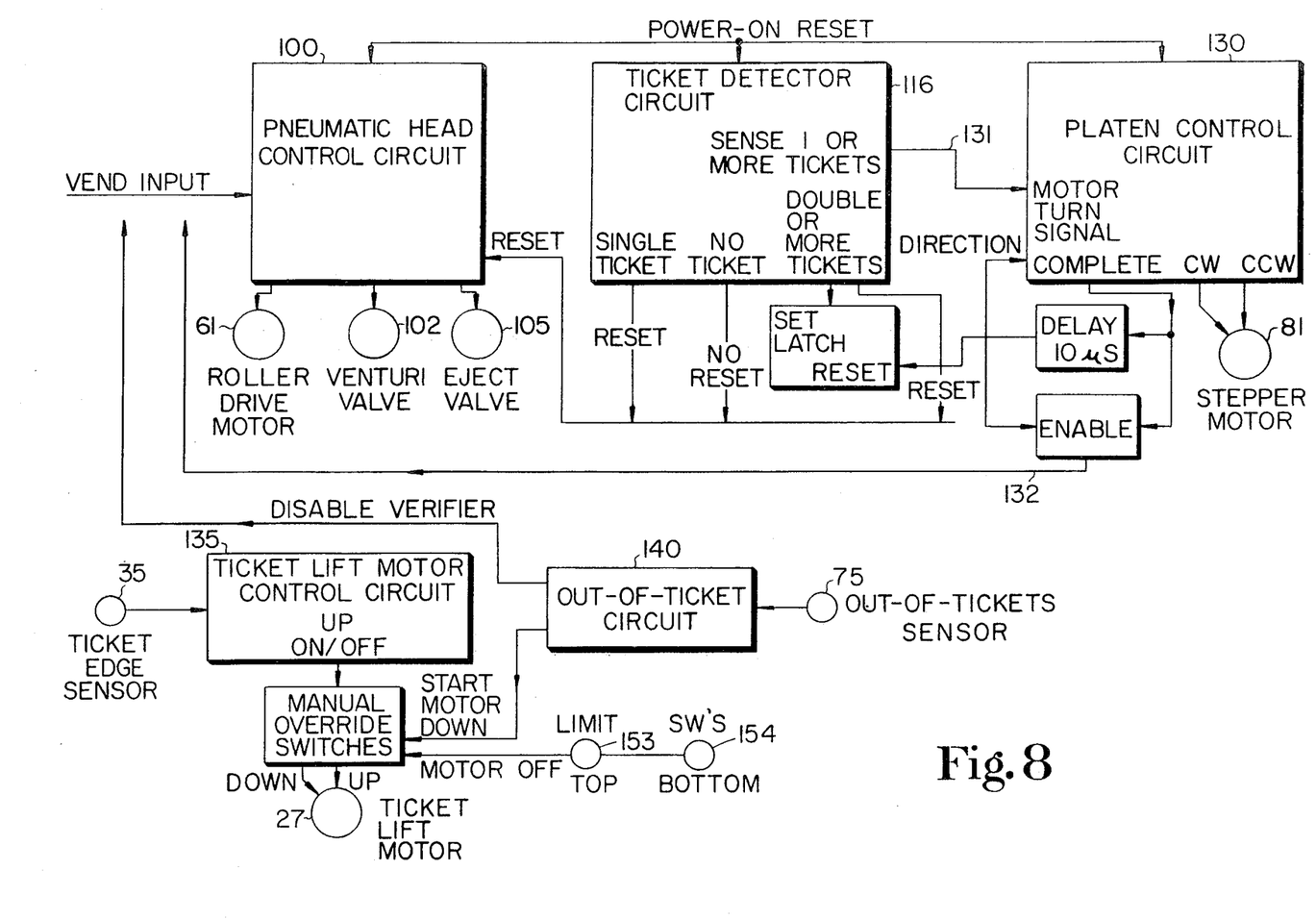
FIG. 8 is a block diagram of the electrical circuit of the present invention.

The system logic schematic is shown in FIG. 8. The money accepting system generates a "Vend" signal which starts the ticket dispense sequence. FIG. 8 shows input at the extreme left as "Vend Input". This signal is a 25 V AC, momentary signal. This Vend signal closes a relay 99 (FIG. 10) in the pneumatic head control circuit 100. When the relay is closed it immediately turns on a latch 112 which furnishes current to the roller drive motor 61. A short time later the valve 102 which controls the venturi jet orifice 41 is actuated "on" and air is caused to flow out the venturi orifice. While the venturi valve is still latched on, the eject valve 105 is opened by its' control latch 106. The resulting blast of air from the eject orifice 40 pushes the ticket into the first set of rollers 51 and 52.

Figure 9:
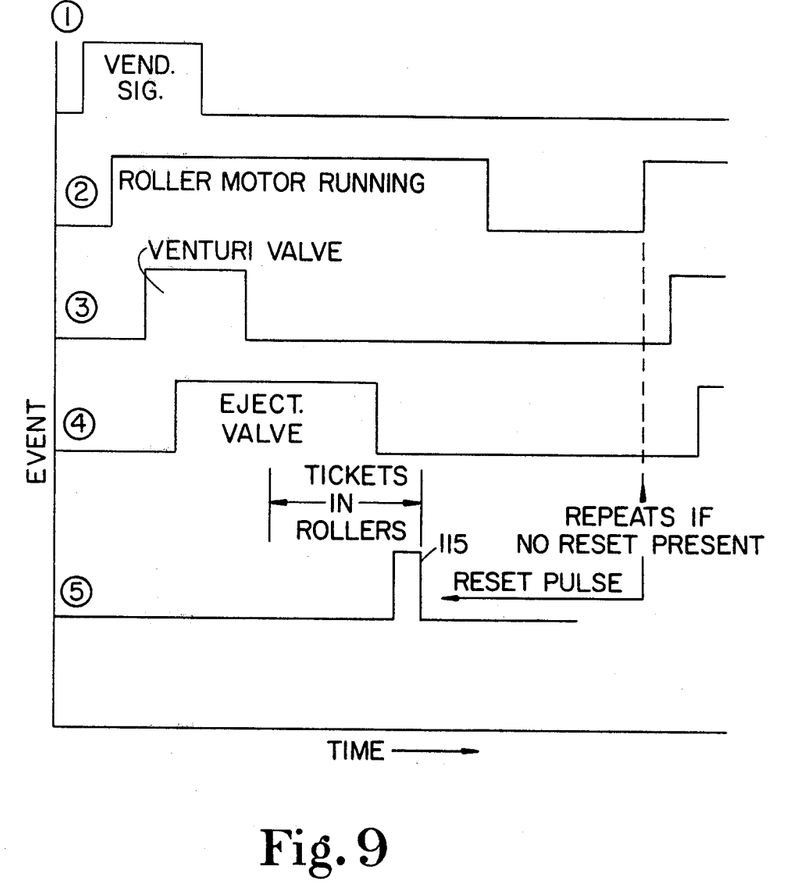
FIG. 9 is a graph showing the timing of the control pulses of the present device.
Figure 10:
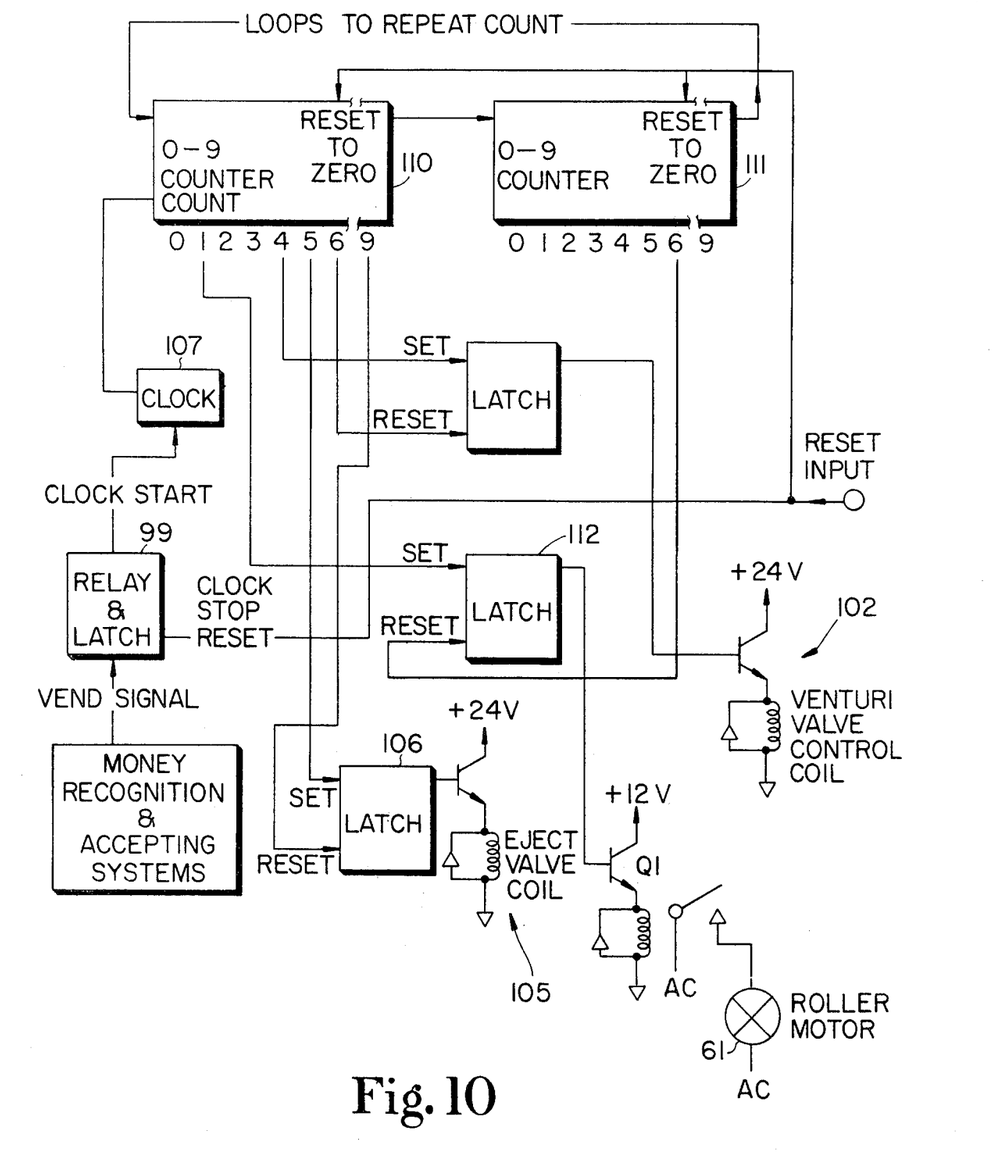
FIG. 10 is a block diagram of the electrical circuit controlling the air pressure supply of the present invention i.e. the pneumatic head control circuit.

FIG. 10 shows the pneumatic head control circuit 100 which includes a clock 107 and counters 110 and 111. This circuitry may comprise for example an RCA integrated circuit CD4017 0 to 9 counter. The two counters are connected so as to count from 0 to 18. Once the clock is started it pulses the 0 to 9 counter 110 through nine output pulses on terminals 1 through 9. The next nine pulses from the clock 107 cause the counter 111 to emit nine pulses from its output terminals 1 through 9 in order. A typical timing of the control signals is shown in the graph FIG. 9. Each of the pulses from the counter is provided at approximately 100 milliseconds. Therefore, the timing of the circuit is first the vend signal and then 100 milliseconds later the roller motor is turned on. At approximately 400 milliseconds the latch 112 for venturi valve 102 is energized and remains on until 600 milliseconds. At 500 milliseconds the latch 106 for the eject valve comes on and remains on until 900 milliseconds.

By operating the air valves in pulse mode, the various ticket actions (responses) to the air blasts may be cascaded in time to effect the issuance of the ticket from the container 20. The roller motor 61 will continue to rotate for a length of time sufficient to move the ticket through the rollers and onto the dump gate. In the typical timing arrangement the roller motor remains on for approximately 1400 milliseconds.

The reset pulse 115 stops the cyclic action of events 1 through 4 in FIG. 9. If the reset pulse is not present, events 2 through 4 repeat i.e. the unit tries to vend a ticket again. The reset pulse 115 is generated by the double ticket sensor 60 and its associated logic circuit 116 FIG. 8.

The double ticket sensor has two functions:
1. To determine whether or not a ticket or tickets are in the rollers 51, 52, 55 and 56 and to generate a reset signal if a ticket or tickets are, indeed, going through the rollers.
2. To determine if there is a single ticket between the rollers or more than one ticket; and to generate appropriate signals to the platen or dump gate control circuit depending on whether there is one ticket or two or more tickets.

Figure 11A:
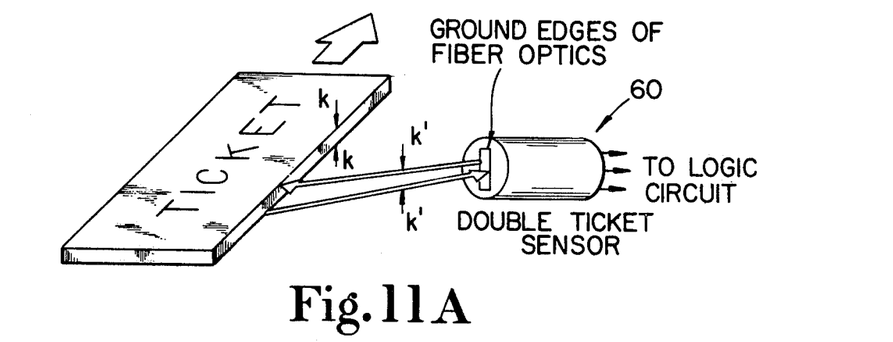
FIG. 11A is a perspective somewhat schematic view of a double ticket sensor forming a part of the present apparatus.
Figure 11B:
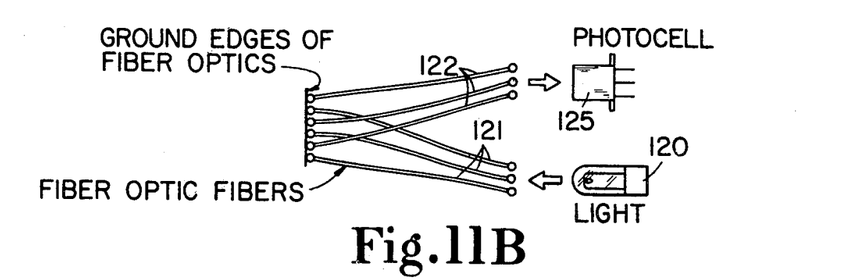
FIG. 11B is a somewhat schematic view of sensing apparatus forming a part of the present apparatus.
Figure 11C:
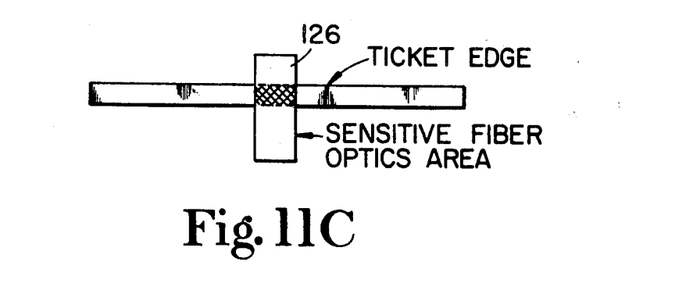
FIG. 11C is a side elevation of the ticket edge showing it in relation to the sensitive portion of the fiber optics.

FIGS. 11A, 11B and 11C show the relationship of the double ticket sensor and the ticket edge. The sensor 60 is constructed as shown in FIG. 11B. This is a commercially available device and might be for example Model No. 23200028 manufactured by Welch Allyn of Skaneateles Falls, New York. The sensor 60 used has a sensitive fiber optics area, comprising a rectangle 126 with the long side of the rectangle at 90 degrees with respect to the length of the ticket; see FIG. 11C. The projection of a part of the ticket thickness upon the rectangle is shown in FIG. 11C. This means that as the ticket moves up and down in its passage through the rollers, the signal from the double ticket sensor is unaffected since the projected relative overlapping areas remain unchanged within the limits of the rectangular length. Motion of the ticket in other axes is restricted by the ticket channel.

After the ticket (or tickets) have passed through the feed rollers and double ticket detector they fall onto the movable plate 77. A time delay, which is initiated when the ticket is no longer sensed as present, insures that the ticket has time to arrive on the dump gate. The dump gate is rotated either clockwise or counterclockwise by the reversible stepper motor 81. Rotation is clockwise if the ticket detector circuit has detected one ticket as present and is counterclockwise if two or more tickets are detected as present. This action either stores the tickets or delivers a single ticket to the customer. If the tickets are stored, the control circuit is signaled to feed out another ticket.

A block diagram of the stepper motor control circuit 130 is also shown in FIG. 8. This circuit is merely a stepper circuit which produces stepping pulses to the stepping circuit motor 81. The signal 131 from the ticket detector circuit 116 tells the circuit 130 which direction to rotate and then starts the rotation in that direction. The stepper motor then steps through $7\frac{1}{2}$ degree increments until the plate 77 is vertical and then steps in reverse back to the horizontal starting position. When the rotation is complete and the plate is horizontal, the vend input is signalled by the signal 132 to try to vend again if the platen direction was clockwise. If on the other hand the rotation was counterclockwise, the cycle is complete. The platen control circuit is commercially available as IC SAA 1027 from the North American Phillips Control Corporation of Cheshire, Connecticut who also manufactures and sells the stepper motor 77.

Returning again to FIG. 9 and to the typical timing cycle described above, the roller motor continues to run until approximately 1500 milliseconds from the cycle start. If no reset pulse is received from the sensing of a single or double ticket the circuit will continue to attempt to vend a ticket by repeating the sequence shown in FIG. 9. FIG. 8 also shows the ticket lift motor control circuit 135 which operates the elevator motor 27 to position the top ticket a predetermined distance below the container top. The ticket edge sensor 35 functions similarly to the sensor shown in FIGS. 11A, 11B and 11C. The output of the photocell is fed into an amplifier which in turn feeds into a comparator which operates a relay output. When the relay is made the motor 27 is on lifting and when the relay is opened by the ticket being sensed the motor is turned off. As tickets are used from the top of the stack, the photocell again actuates the motor 27 to lift the stack. Thus the device operates somewhat like a servo mechanism but only in one direction.

The out-of-ticket circuit 140 is operated by the ticket sensor 75. The middle of the tickets have a white spot on them. As long as the sensor sees the white spot on a ticket, the circuit does not permit a motor reversing relay to be energized. When the last ticket is removed from the elevator platen, the black platen surface is sensed by the sensor 75 and the elevator motor 27 operates to lower the platen to the bottom of its travel for refilling. Other switches which are arranged to control the ticket lift motor 27 are the limit switches 153 and 154 wich are engaged by the elevator 25 at the limits of its travel and which shut off the motor to prevent damage. Switch 153 is shown in FIG. 2; switch 154 is shown only in FIG. 8.

Figure 12:
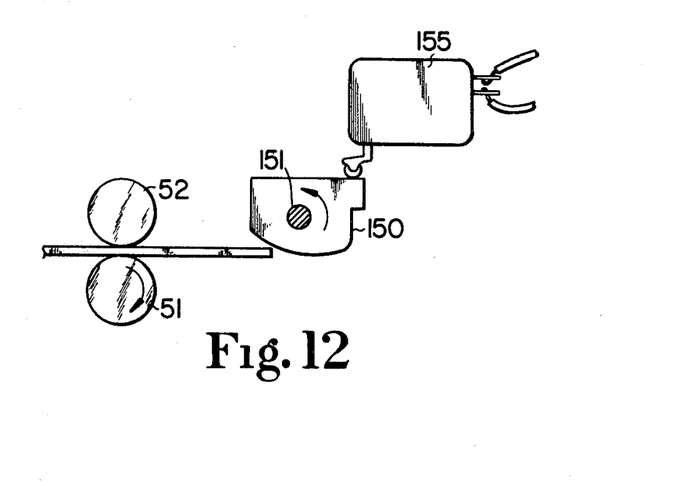
FIG. 12 is a fragmentary side elevation similar to FIG. 3 of an alternative embodiment of the present invention.

Referring to FIG. 12, there is illustrated an alternative method of sensing the number of tickets traveling on the horizontal surface 71. A cam 150 is pivoted by shaft 151 to the guide 72. The microswitch 155 is fixed relative to the guide 72. Depending on the thickness of the ticket or tickets the microswitch 155 is actuated to a certain position closing appropriate contacts indicating none, one or two or more tickets are present.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. Apparatus for dispensing rectangular tickets or the like comprising:
   a container having a vertically extending opening therin with a rectangular horizontal cross section adapted to loosely receive a stack of tickets, said container having a top and a ticket passage slot adjacent thereto and leading from said opening to the outside of said container;
   an elevator mounted for vertical movement in said container and adapted to support the stack of said tickets;
   means for operating said elevator to position the uppermost ticket thereon slightly below said top;
   said container having air jet orifices therein, a first of which is located in the container side wall on the opposite side of said container from said slot, said first orifice extending toward the side of the stack of tickets below the uppermost tickets, a second of said orifices being located in said container top on the opposite side of said container from said slot, and a third of said orifices being located in said continer top above said slot;
   means for providing a blast of air under pressure through said first orifice to break apart the tickets in the stack and through said second and third orifices to move a ticket from the top of the stack of tickets out of the container through said slot; and
   controller means for electronically timing and sequencing the air under pressure from said air jet orifices.

2. Apparatus for dispensing thin objects comprising:
   a container for a stack of the objects, said container having a top and an object passage slot adjacent thereto;
   an elevator mounted for vertical movement in said container and adapted to support the stack of objects with the uppermost object just below said top;
   said container having air jet orifices therein, a first of which is located in the container side wall on the opposite side of said container from said slot, said first orifice extending toward the side of the stack of objects below the uppermost objects, a second of which is located in said container top on the opposite side of said container from said slot, and a third of which is located in said container top above said slot;
   means for providing a blast of air under pressure through said first orifice to break apart the objects in the stack and through said second and third orifices to move an object from the top of the stack of objects out of said container through said slot; and
   controller means for electronically timing and sequencing the air under pressure from said air jet orifices.

* * * * *